United States Patent [19]

Sameth et al.

[11] Patent Number: 5,697,789

[45] Date of Patent: Dec. 16, 1997

[54] METHOD AND SYSTEM FOR AIDING FOREIGN LANGUAGE INSTRUCTION

[75] Inventors: James E. Sameth, Issaquah; Bert S. Sullam, Kent, both of Wash.

[73] Assignee: Softrade International, Inc., Bellevue, Wash.

[21] Appl. No.: 346,150

[22] Filed: Nov. 28, 1994

Related U.S. Application Data

[63] Continuation-in-part of Ser. No. 343,818, Nov. 22, 1994, abandoned.

[51] Int. Cl.$^6$ ............................ G09B 19/06; G09B 19/08
[52] U.S. Cl. ............... 434/157; 434/156; 434/307 R; 395/154; 364/419.01
[58] Field of Search .................. 434/156, 157, 434/169, 185, 307 R–309, 318, 322, 323, 365, 118; 395/152–154; 364/419.01–419.05, 419.19

[56] References Cited

U.S. PATENT DOCUMENTS

| | | |
|---|---|---|
| 4,170,834 | 10/1979 | Smart . |
| 4,193,119 | 3/1980 | Arase et al. . |
| 4,467,446 | 8/1984 | Sakurai . |
| 4,685,060 | 8/1987 | Yamano et al. ............... 443/157 X |
| 4,730,270 | 3/1988 | Okajima et al. . |
| 4,791,587 | 12/1988 | Doi ............................ 434/157 X |
| 4,913,539 | 4/1990 | Lewis . |
| 4,954,969 | 9/1990 | Tsumura ..................... 395/154 X |
| 4,980,829 | 12/1990 | Okajima et al. ............... 434/157 X |
| 5,010,495 | 4/1991 | Willetts ...................... 434/185 X |
| 5,091,876 | 2/1992 | Kumano et al. ............... 434/157 X |
| 5,109,482 | 4/1992 | Bohrman ..................... 395/154 |
| 5,111,409 | 5/1992 | Gasper et al. ................ 434/309 R X |
| 5,136,655 | 8/1992 | Bronson . |
| 5,145,376 | 9/1992 | Krass . |
| 5,275,569 | 1/1994 | Watkins . |
| 5,286,205 | 2/1994 | Inouye et al. . |
| 5,308,244 | 5/1994 | Hirose . |
| 5,385,475 | 1/1995 | Sudman et al. ............... 434/307 R |
| 5,388,993 | 2/1995 | McKiel et al. ............... 434/307 R X |

FOREIGN PATENT DOCUMENTS

| | | |
|---|---|---|
| 0 507 743 A3 | 10/1992 | European Pat. Off. . |
| 0 665 523 A2 | 8/1995 | European Pat. Off. . |
| 2 198 871 | 6/1988 | United Kingdom . |
| WO 93/16455 | 8/1993 | WIPO . |
| WO 95/09506 | 4/1995 | WIPO . |

OTHER PUBLICATIONS

"Content Oriented Visual Interface Using Video Icons for Visual Dtatbase Systems" by Tonomura et al., IEEE, pp. 68–73, 1990.

Power Japanese, Installation Guide and Course Contents, BayWare Inc., San Mateo, California, 1993.

Mangajin, Japanese Pop Culture & Language Learning Magazine, No. 37, Aug. 1994, pp. 34–35.

*Primary Examiner*—Joe Cheng
*Attorney, Agent, or Firm*—Seed and Berry LLP

[57] ABSTRACT

Disclosed is a method and apparatus for aiding foreign language instruction, comprising a language instruction program that runs on a multimedia computer. The language instruction program uses a story to teach the foreign language by displaying selected frames about the story and dialog balloons that include phrases in the foreign language associated with the frames. Translations of the phrases are also displayed. As a further aid, a pronunciation guide displays an animated representation of a person's lips as the correct enunciation of selected words in the foreign language.

26 Claims, 17 Drawing Sheets

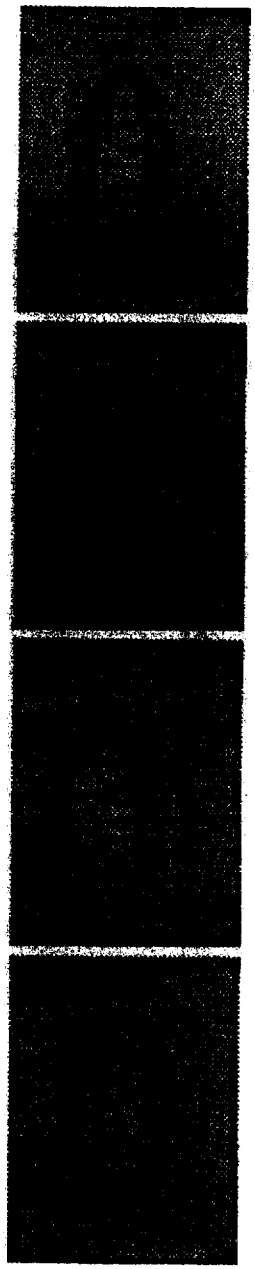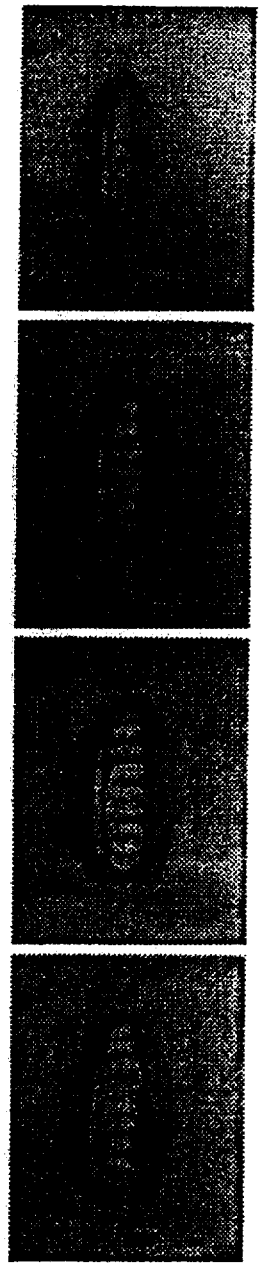
Fig. 6B  Fig. 6C  Fig. 6D  Fig. 6E  Fig. 6F  Fig. 6G  Fig. 6H  Fig. 6I  Fig. 6J  Fig. 6K  Fig. 6L

METHOD AND SYSTEM FOR AIDING FOREIGN LANGUAGE INSTRUCTION

CROSS-REFERENCE TO PRIOR APPLICATION

This application is a continuation-in-part of U.S. patent application Ser. No. 08/343,818, filed Nov. 22, 1994 now abandoned.

FIELD OF THE INVENTION

The invention generally relates to foreign language teaching aids and, more particularly, to an apparatus for and method of aiding the instruction of a foreign language using interactive multimedia.

BACKGROUND OF THE INVENTION

With ever-increasing world trade and other global interaction, the desirability and benefits of understanding different languages and cultures have perhaps never been more apparent. From this stems an increasing interest in foreign language teaching aids.

Traditional teaching aids include classroom instruction, flash cards, audio cassettes, magazines, and books. Each has their own advantages and disadvantages. Classroom instruction provides valuable interaction with instantaneous feedback, but requires the student to conform to the classroom schedule and pace. Flash cards, magazines and books are relatively inexpensive, but do not provide audible feedback to the student. With audio tapes, the student may not have access to written text.

More recently, computer software programs have become available for teaching foreign languages. The popularity of computer software teaching aids is, in large part, due to the proliferation of multimedia computers. Multimedia computers, which have the ability to combine text, sound, and graphics, have presented significant opportunities for the creation of interactive computer-based teaching aids that cater to those wanting a relatively inexpensive, and yet effective, means of independent language study.

One popular computer software program that instructs English speaking persons on the Japanese language is "Power Japanese," distributed by BayWare, Incorporated of Mountain View, Calif. "Power Japanese" and similar language learning programs provide a number of advantages over traditional teaching methods. In particular, software-based teaching aids have the capability of combining the audio benefits of cassettes with the visual benefits of magazines and books, along with drills that may be selected based on the progress of the student. A downfall of existing software-based teaching aids is that it is sometimes still difficult to ascertain how to correctly pronounce a word or phrase simply by hearing the word or phrase.

Aside from the particular medium used as a teaching aid, another challenge in facilitating the learning process is keeping the student interested in the subject matter being taught. Mangajin, a publication devoted to Japanese pop culture and language learning, has attempted to maintain the reader's interest by publishing Japanese comic strips along with English translations of the Japanese dialog contained in the comic strips. The magazine also has published an American comic strip, i.e., "Calvin and Hobbes," with a Japanese translation of the dialog contained therein.

Despite the progress that has been made, there is still a need for the development of foreign language teaching aids that can clearly and effectively communicate the pronunciation of words and phrases in unfamiliar languages. In contrast to the prior art discussed above, the invention promotes the learning process by providing a variety of effective techniques for associating foreign words and phrases with a familiar language, and by adding a pronunciation guide to innovative audiovisual teaching and feedback techniques.

SUMMARY OF THE INVENTION

The invention is an improved method and system of aiding foreign language instruction using a computer having a processor, a memory, a monitor, and one or more speakers. The method comprises the steps of: (a) storing a plurality of audiovisual presentations of several words in the foreign language, each audiovisual presentation having an audible component that includes a pronunciation of each word in the foreign language and a visual component that includes a representation of lips enunciating the word; (b) selecting a word in the foreign language; (c) retrieving the stored audiovisual presentation for the selected word; and (d) displaying the visual component of the retrieved audiovisual presentation, including the representation of lips enunciating the selected word, while playing the audible component of the retrieved audiovisual presentation. This method enables a user to see lips enunciating the selected word while hearing the word being spoken, thus aiding the user in learning how to pronounce the selected word in the foreign language.

In one embodiment, a textual representation of the selected word in the foreign language is also displayed while displaying the representation of lips enunciating the selected word and while playing the audible component of the audiovisual presentation of the selected word. Seeing the textual representation in conjunction with hearing the selected word and seeing the lips pronouncing the selected word further reinforces the user's learning process.

In accordance with other aspects of the invention, one embodiment further includes displaying in a familiar language a verbatim translation of the selected word in the foreign language. In yet another embodiment, the method displays a verbatim translation of a word related to the selected word to provide a related usage example.

In accordance with yet other aspects of the invention, one embodiment further displays a dialog balloon that includes a phrase of words in the foreign language which relates to a portion of an audiovisual story. The dialog balloon is displayed while the speech associated with the phrase is played. In addition, another embodiment displays a colloquial translation in the familiar language of the foreign language phrase displayed in the dialog balloon.

In accordance with yet other aspects of the invention, the method and system further provides an audiovisual story with a sequence of video frames and audio segments of phrases of words in the foreign language. In addition, one embodiment provides a continuous play mode to display the video frames and audio segments in the story sequence, so that the audio soundtrack is heard continuously instead of as selected audio segments. In yet another embodiment, the method and system displays a list of words present in the audio segments and plays an audio segment of the story that contains a selected word, while displaying the video frame associated with that audio segment. In another embodiment, the method and system displays a role of one of the characters in the audiovisual story.

BRIEF DESCRIPTION OF THE DRAWINGS

The foregoing aspects and advantages of the invention will become more readily appreciated as the invention becomes better understood by reference to the following detailed description, when taken in conjunction with the accompanying drawings, wherein:

FIGS. 6A-6L are pictorial representations depicting sequential operation of the pronunciation guide in accordance with the invention;

DETAILED DESCRIPTION OF THE PREFERRED EMBODIMENT

Figure 1:
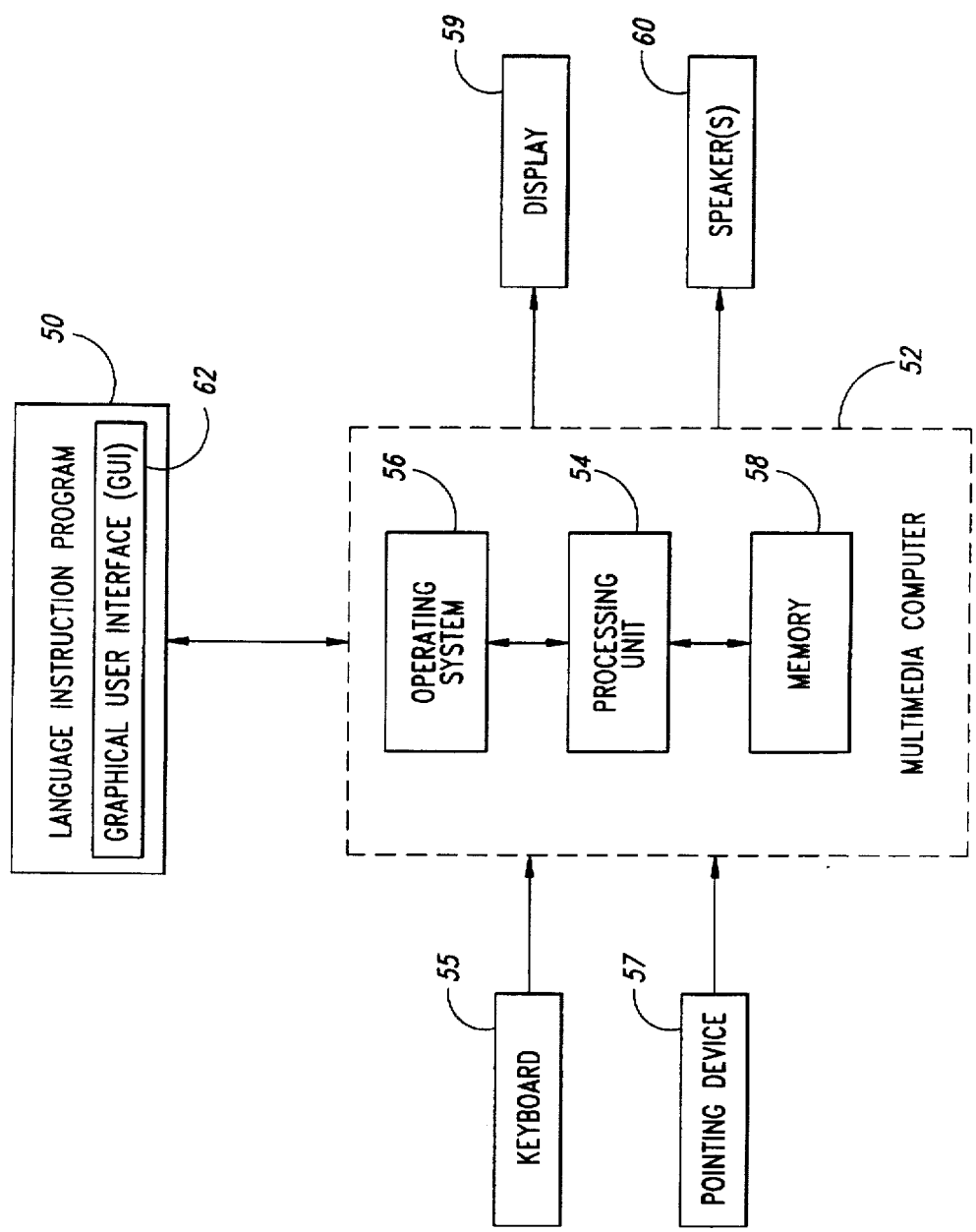
FIG. 1 is a block diagram depicting a language instruction program for use with a multimedia computer in accordance with the invention.

FIG. 1 illustrates a computer software language instruction program 50 that may run on a multimedia computer 52 for use in teaching a foreign language in accordance with the invention. A multimedia computer is generally defined as a computer having the ability to combine sound, graphics, animation and video. For purposes of this disclosure and the claims, the term "foreign language" refers to any unfamiliar spoken language in which a person has an interest in learning or investigating, and is not meant to refer to nationality. A language that the person does have understanding of, or is fluent in, is termed a "familiar language."

The multimedia computer 52 typically includes a processing unit 54 that is controlled by an operating system 56, memory 58 connected to the processing unit, one or more data or instruction input devices such as a keyboard 55 and a pointing device 57, a video display 59, and one or more internal or external speakers 60. The pointing device 57 may be a computer mouse, a track ball, or other device that provides cursor control. The memory 58 generally comprises, for example, random access memory (RAM), read only memory (ROM), magnetic storage media, such as a hard drive, floppy disk, or magnetic tape, and optical storage media, such as a CD-ROM. A graphical user interface (GUI) 62 within the language instruction program 50 interacts between the operating system 54 and the internal process application of the language instruction program. The multimedia computer 52 may be a commercially available personal computer, such as a Macintosh™, International Business Machines (IBM)™, or IBM-compatible personal computer. When used with IBM and IBM-compatible personal computers, the operating system 54 may incorporate a windowing environment such as Microsoft Windows® or OS/2™.

Figure 2:
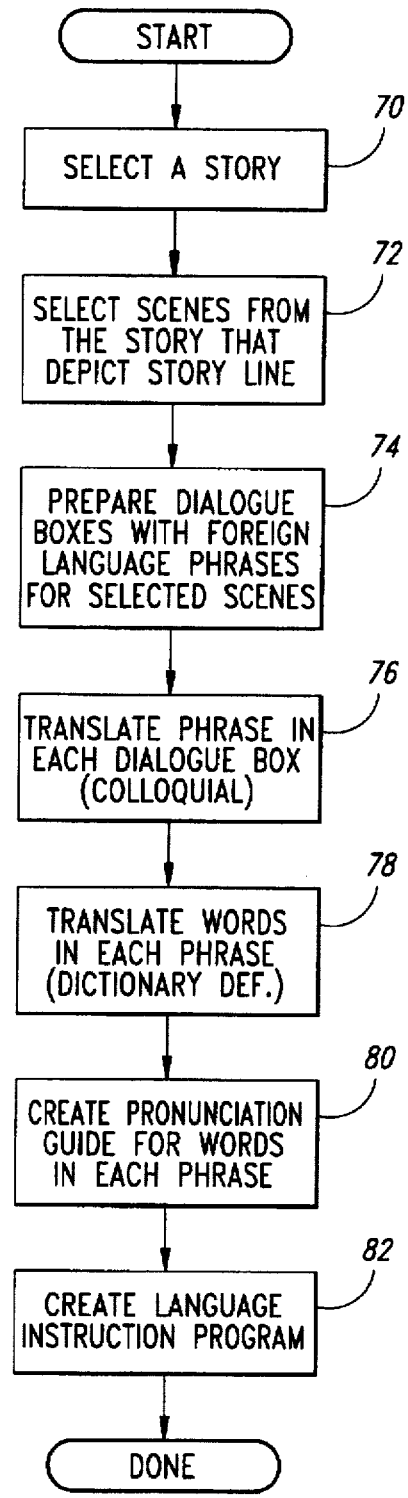
FIG. 2 is a flow diagram illustrating the steps taken by a program developer in creating a preferred embodiment of the language instruction program.

FIG. 2 illustrates a series of steps that describe the process that a program developer may go through when creating a preferred embodiment of the language instruction program. The language instruction program preferably incorporates a storyline, an animated pronunciation guide, and translation features to provide an entertaining and informative foreign language aid. The depicted steps are shown to assist in describing the invention, and are not steps carded out by the language instruction program itself.

At block 70, a story is selected for use in creating an embodiment or version of the language instruction program. In a version of the language instruction program described below, it is assumed for clarity in this discussion that the story is adapted from an episode of the popular American television series "Murder She Wrote." In this version of the language instruction program, the program is designed to assist Japanese reading/speaking persons in learning the English language. It will be appreciated by those skilled in the art, however, that the story may stem from other sources, such as other television programs, books, or movies, and that the particular language being taught is not germane to the invention.

At block 72, individual pictorial frames from the story, e.g., a "Murder She Wrote" episode, are selected. The number and nature of the frames selected will depend upon the particular story used, the length desired for a particular version of the language instruction program, and the amount of text that a program developer wishes to incorporate into that version. After selection of a story and the desired frames, dialog balloons are created, each including a phrase in the foreign language relating to one or more of the selected frames, as indicated at block 74. At block 76, the phrases in the dialog balloons are translated into the familiar language. This translation is a colloquial translation in that the resultant text is not necessarily verbatim, but a representation of each phrase that is appropriate for the familiar language.

At block 78, a verbatim translation is made of the individual words in each phrase. This translation typically includes the familiar language dictionary definitions of the foreign language words. In addition, translations of phrases in which the word is found, or of words that are related to the word being translated, may be included. As an example, a translation of the word "embarrassed" might also include translations of: "embarrass" and "to be embarrassed." Thus, in some instances, the process remits in a group of related words in the foreign language, with their familiar language translations placed nearby.

At block 80, a pronunciation guide is created for the individual words in each phrase. The pronunciation guide, described further below, is an animated or video representation of a person's lips correctly enunciating the individual word. In one embodiment, the pronunciation guide is created by videotaping a person's mouth as the person pronounces each individual word, digitizing the videotaped information, and then linking the digitized information to each word for subsequent recall. The pronunciation guide provides a significant advantage over prior teaching aids because it allows a viewer to see the appropriate movements of a mouth as a word is spoken. Those skilled in the art will appreciate that other animation techniques may also be used to accomplish this goal. At block 82, the program developer uses the information gathered, created, and stored in blocks 70-80 to create a version of the language instruction program.

A more in-depth understanding of the language instruction program 50 may be acquired by the following screen shots taken from a prototype of the language instruction program. With reference to FIG. 9A, at start-up a dialog box 100 indicates to a viewer that a version of the language instruction program on CD-ROM, titled "Murder She Wrote," has been detected in the CD-ROM drive of the multimedia computer. At this point, the viewer may use the computer pointing device to: select "OK" at dialog box 102 to continue; select a Japanese phrase indicating that another CD-ROM may be inserted at dialog box 104; or quit the program by selecting dialog box 106.

Figure 3A:
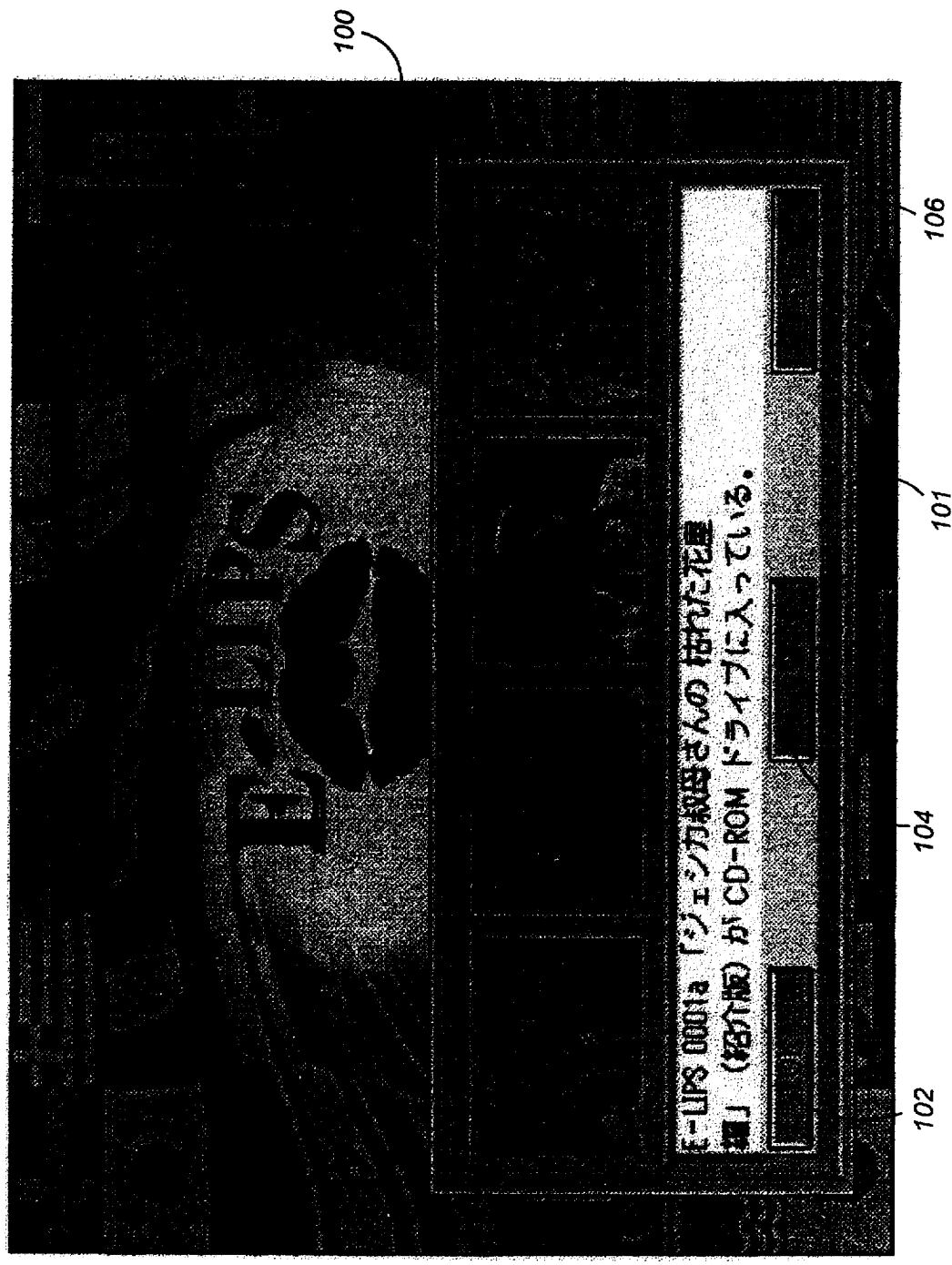
FIGS. 3A-3C are pictorial representations depicting start-up screens of an embodiment of the language instruction program.
Figure 3B:
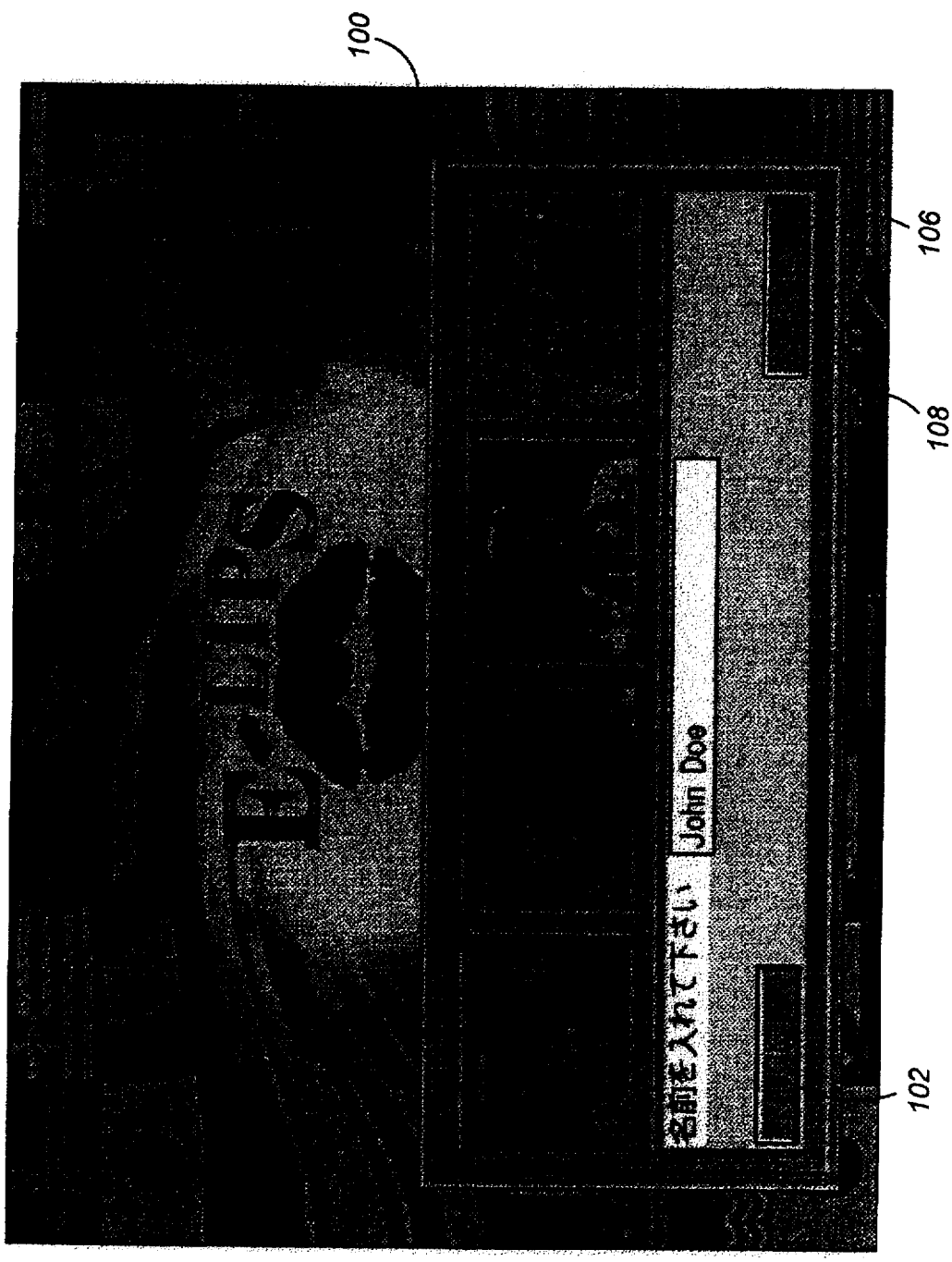
Figure 3C:
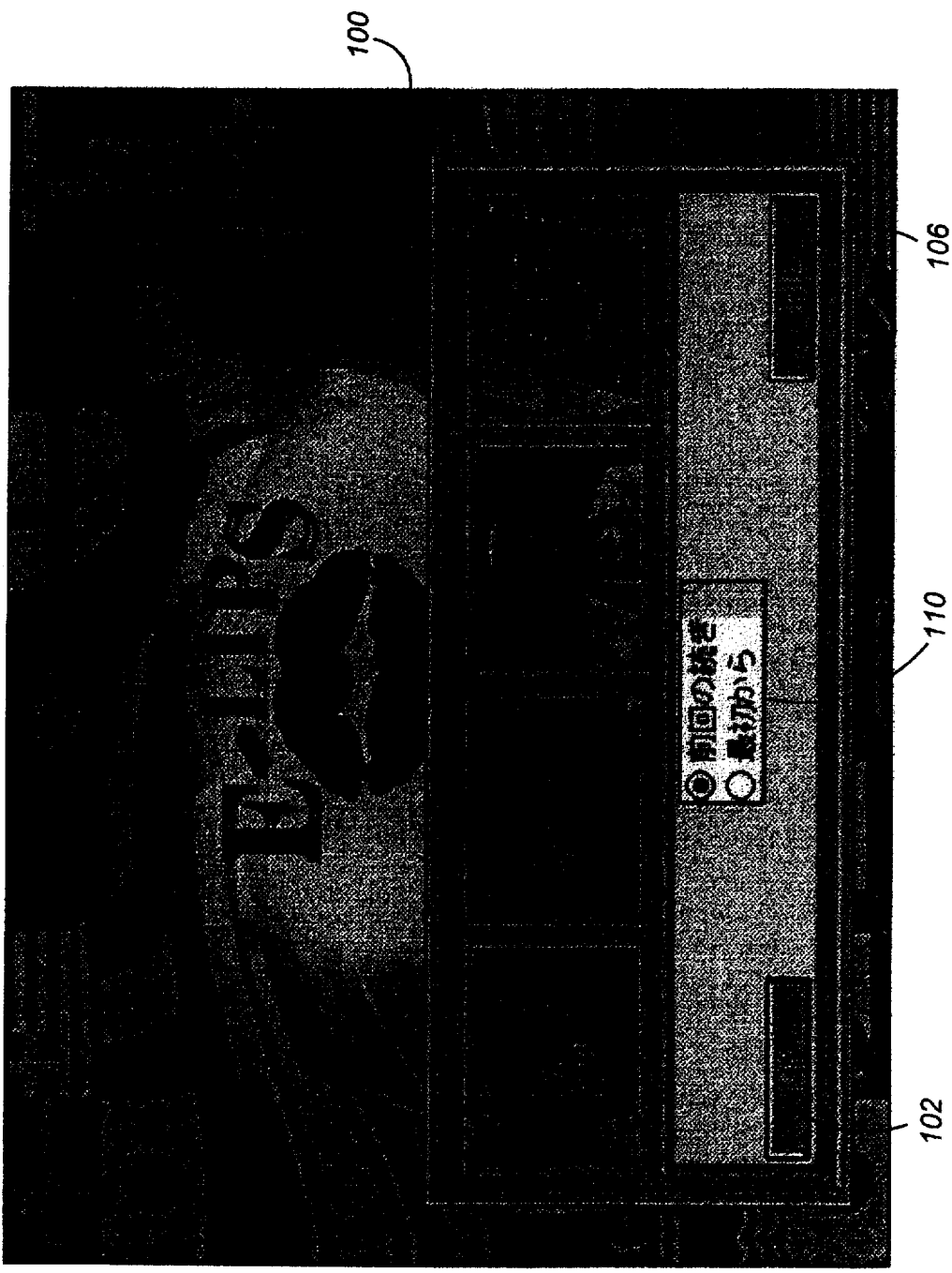

FIG. 3B illustrates a subsequent screen shot in which the viewer is prompted to use the computer keyboard to enter his or her name, shown in dialog box 108. After the viewer's name has been entered, dialog box 102 may be selected to continue, or the viewer can exit the program by selecting dialog box 106. Upon continuing, the screen shot shown in FIG. 3C appears, where the viewer may either start from the beginning of the episode by selecting box 102, or resume from a point in the episode at which the viewer quit in a prior session by selecting a dialog box 110.

Figure 4A:
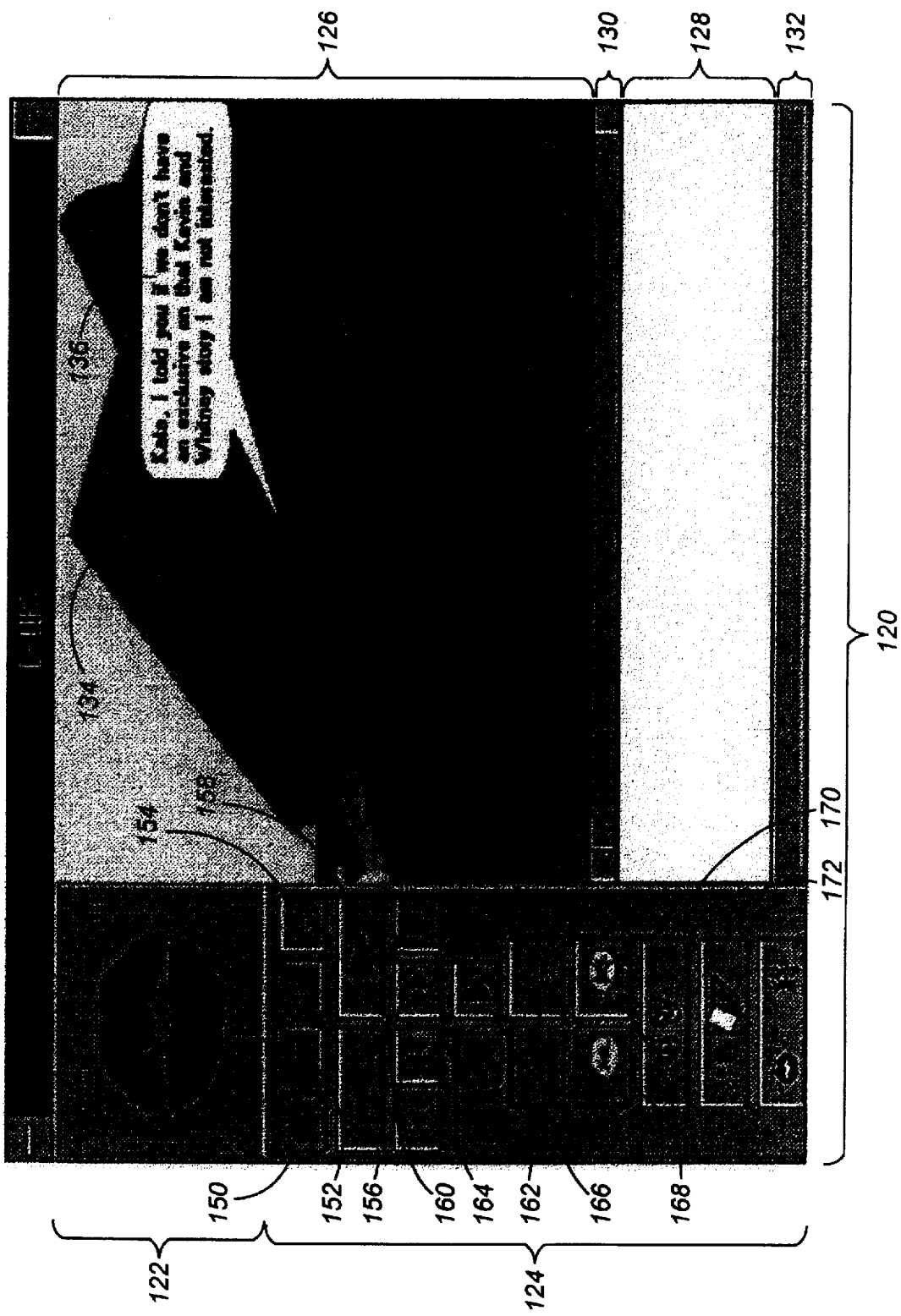
FIGS. 4A-4B are pictorial representations depicting the pronunciation guide and various display and control panels for use in operating the language instruction program.

FIG. 4A illustrates a display box 120 of a frame in the "Murder She Wrote" episode. For ease of description, the display box 120 may be broken into six components: a pronunciation guide 122, located in the upper left corner; a control panel 124 having discrete icons or selection areas, located in the lower left corner; a frame display 126, located in the upper right corner, including a dialog balloon 136; a translation window 128 (currently blank), located in the lower right corner; a control bar 130, located between the frame display 126 and the translation window 128; and a message bar 132, located just below the translation window 128. Each of the six components contained in the display box 120 is described further below.

The following is a row-by-row explanation of the control icons/selection areas in the control panel 124:

ROW 1: Lip Icon 150—selecting, e.g., using the computer keyboard or pointing device, the lip icon, or anywhere on the pronunciation guide 122 itself, after having highlighted a word by use of the graphical user interface results in a display of an animated enunciation of the word in the pronunciation guide area of the display box. The word is simultaneously played over the speakers.

Status Window 152—displays the current frame number/total number of frames in a given version of the language instruction program.
    Ear Icon 154—select to play or repeat the phrase in the dialog balloon.
ROW 2: Back Arrow 156—go back to a previous frame.
    Forward Arrow 158—move ahead to the next frame.
ROW 3: Control Icons 160—provide, from left to right, a means to go to the beginning of the story, to rewind back a set number of frames, e.g., ten frames, to fast forward a set number of frames, and to proceed to the end of the story. The functions in the back/forward and control icons may also be performed using the control bar 130.

ROW 4: Start Auto-Play Icon 162 and Stop Auto-Play Icon 164—these allow playing of the story in a "continuous mode" in which the soundtrack from the story is played at normal speed while the corresponding frames are displayed.

ROW 5: Icons 166—provide a toggle between normal and slow speech. In slow speech mode, the audible potion of each phrase in the dialog balloon is stated more slowly in order to better ascertain what is being said. While these could be used to control the speed of the pronunciation guide playback, in a preferred mode the audiovisual playback of the pronunciation guide is already at a relatively slow speed, and thus is not affected.

ROW 6: Balloon Icons 168—provide a toggle between a normal mode in which the dialog balloon 134 is shown, and a hidden mode in which the dialog balloon is hidden.

ROW 7: "Cast of Characters" Icon 170—select to display a screen having a picture of each character from the current story.

ROW 8: "Dictionary Mode" Icon 172—select to display an alphabetical listing of each word contained in the story, beginning with a highlighted word from the dialog balloon 134, if there is one. The definitions of these words are displayed in the translation window 128.

With continued reference to FIG. 4A, the frame display 126 depicts the current frame in the episode. In FIG. 4A, the frame display illustrates a building 134 and a dialog balloon 136. The dialog balloon 136 displays text from a conversation carded on in building 134. It is noted that the text from the dialog balloons throughout the episode is printed in the foreign language being taught, in this case English. As each dialog balloon 136 appears, the phrase contained in the dialog balloon 136 is played over the speaker(s).

Figure 4B:
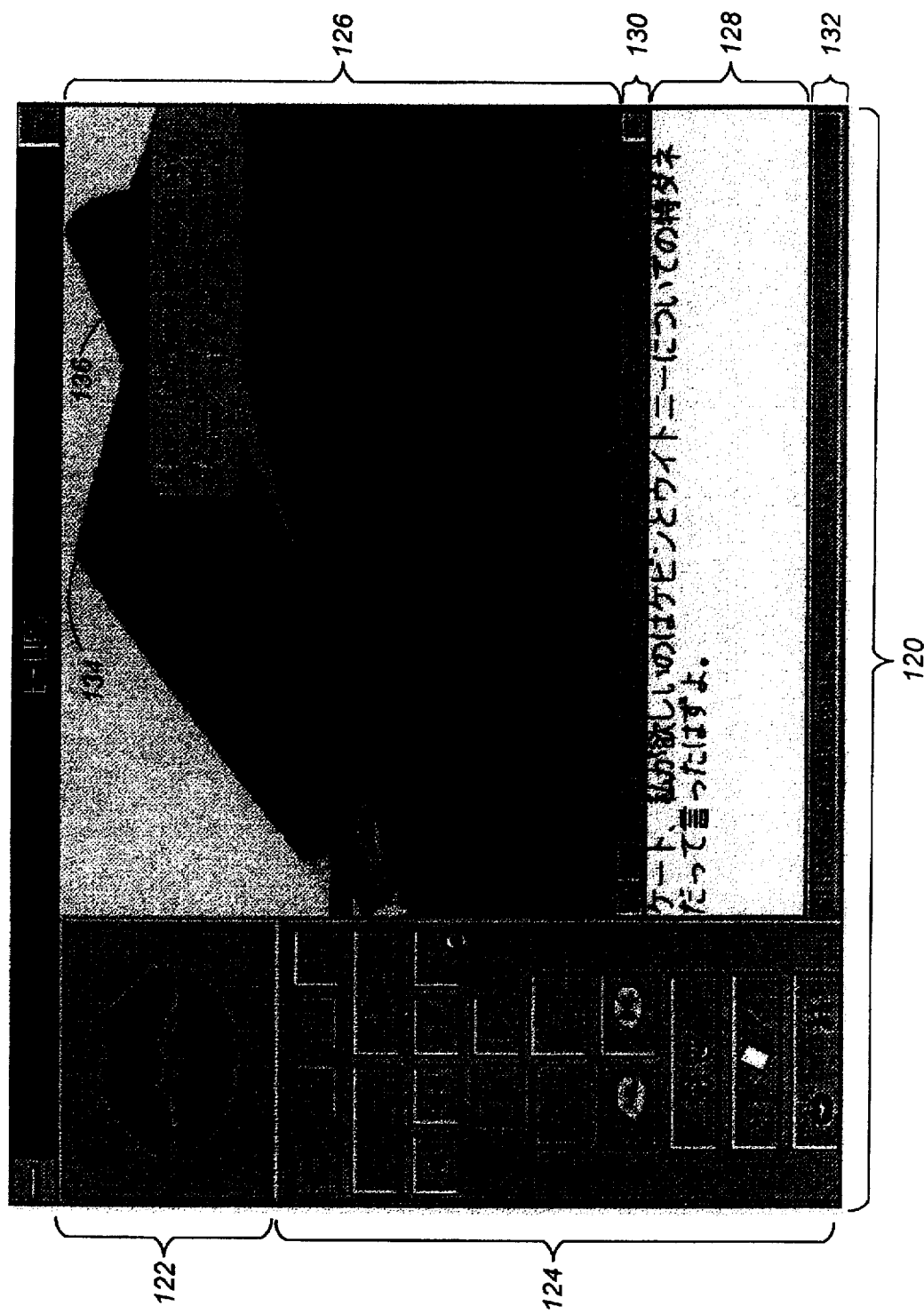

In FIG. 4B, the viewer has instructed the program to display a colloquial translation in Japanese (the familiar language) of the phrase found in dialog balloon 136. In one embodiment, the colloquial translation is displayed by selection of the tail of the dialog balloon 136 itself, such as by manipulation and triggering or actuation of a cursor controller. Also in FIG. 4B, the message bar 132 has been changed to indicate that the audio portion of the phrase in the dialog balloon 136 may be repeated by clicking on the dialog balloon.

Figure 5:
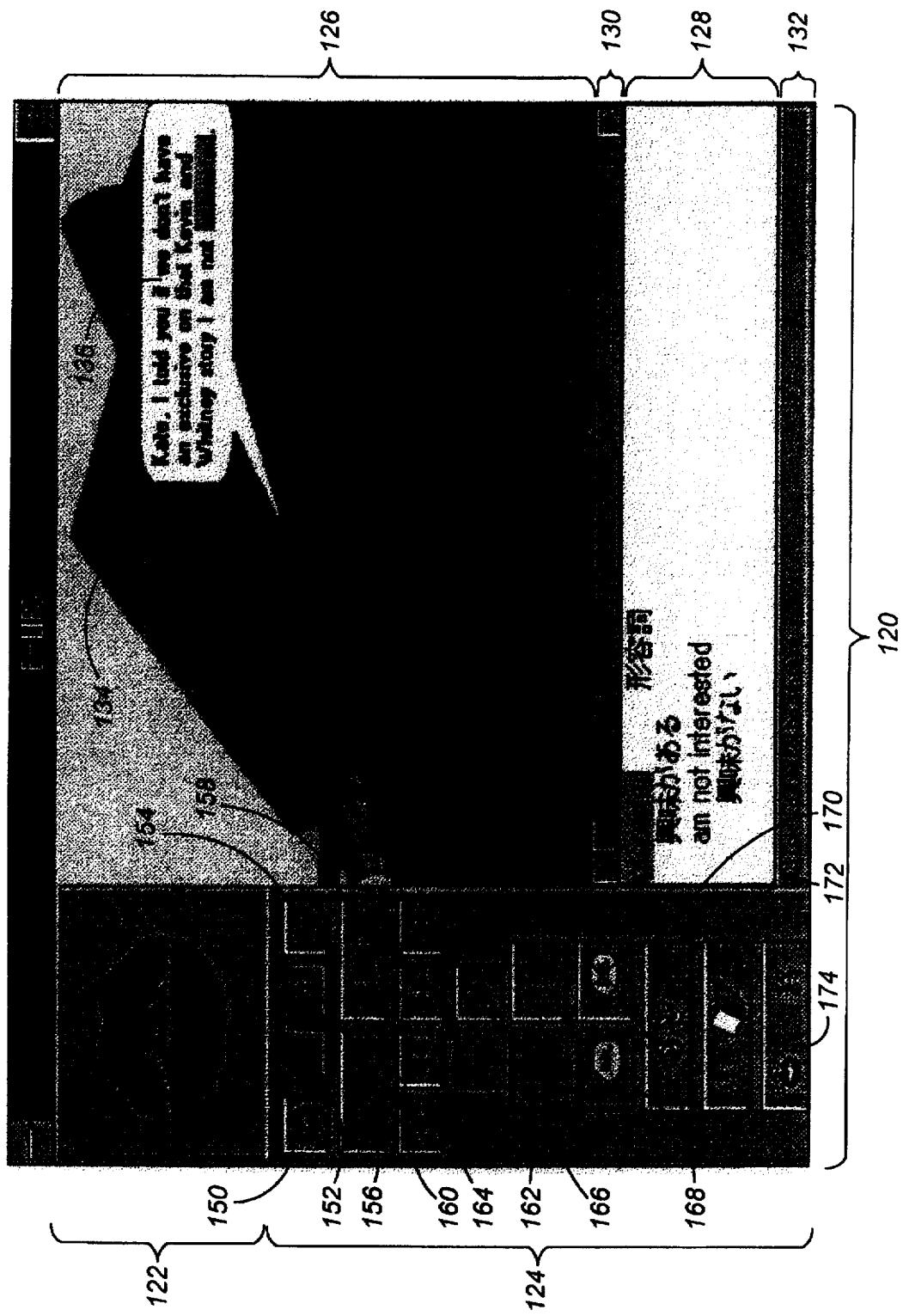
FIG. 5 is a pictorial representation showing the translation of a selected word into a familiar language.

FIG. 5 depicts the frame from FIG. 4B, but wherein a viewer has selected the word "interested" from the phrase in the dialog balloon 136, such as by manipulation and triggering of a cursor controller. As a result, the word "interested" is highlighted within the dialog balloon and the familiar language (Japanese) dictionary definition of the word is displayed in the translation window 128. Dependent upon the particular embodiment of the language instruction program, other information about a selected word may also be displayed in the translation window. In this example, the Japanese definition of the phrase "am not interested" is also displayed in the translation window 128.

Figure 6A:
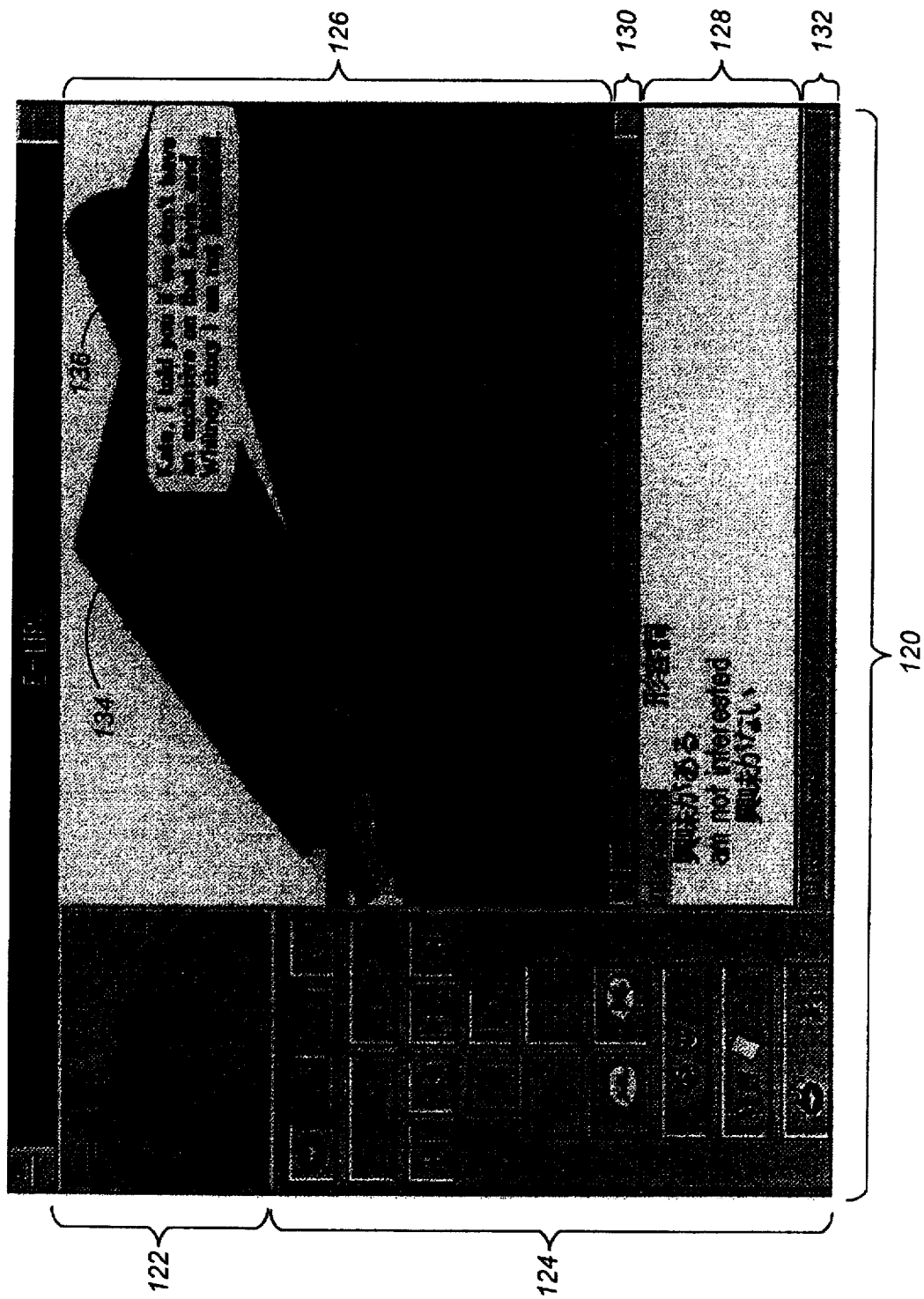

FIGS. 6A–6L illustrate the operation of the pronunciation guide 122. The information displayed in FIGS. 6A is identical to that of FIG. 5, except that the lips icon in the pronunciation guide shown in FIG. 5 has been replaced by a digitized display of a person's lips. The remaining FIGS. 6B–6L show only the contents of the pronunciation guide 122. The pronunciation guide is invoked by highlighting a word in the dialog balloon that a user wishes to both hear and see enunciated and then selecting the pronunciation icon 150, contained in the upper left corner of the control panel 124. The highlighted word will be simultaneously heard from the speakers and displayed in pronunciation guide 122.

The sequential illustrations in FIGS. 6A–6L attempt to show the sequential animation of a person speaking the word "interested." In FIG. 6A, the speaker shown in the dialog balloon has not yet begun to pronounce the word. In FIGS. 6B–6E, the speaker is pronouncing the "in" portion of the word; in FIGS. 6F–6G the speaker is pronouncing the "ter" portion of the word; and in FIG. 6H–6L the speaker is pronouncing the "ested" or remainder of the word. In the actual language instruction program, the enunciation of the entire word is animated. The clips shown FIG. 6A–6L are to provide further understanding of the invention.

Both hearing and seeing a word as it is being pronounced greatly enhances the learning process. The moving lips are readily visible and the word may be repeated as often as necessary. Preferably, the lips are displayed in a window much smaller than one-half the total display area so as not to interfere with other portions of the display. It also is preferred that essentially only the lips be shown, without other facial features that could cause a distraction, and that the lips themselves be colored or darkened in contrast to the surrounding background.

Figure 7:
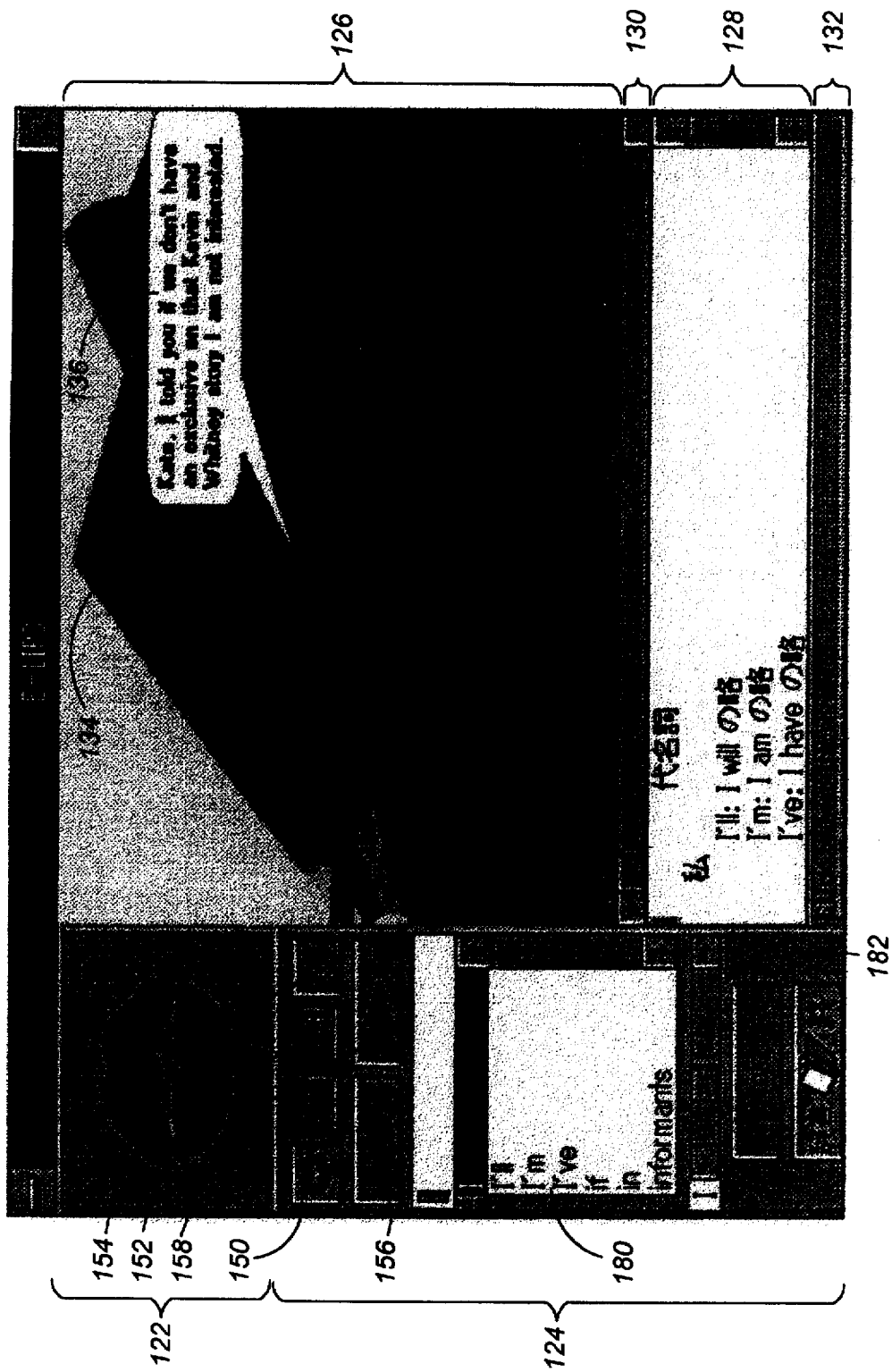
FIG. 7 is a pictorial representation of the dictionary mode of the language instruction program in accordance with the invention.

FIG. 7 illustrates the dictionary mode of the language instruction program which is achieved by icon 172 in the control panel. In the example of FIG. 7, the letter "I" was highlighted prior to entering the dictionary mode. The translated dictionary definition of "I" is displayed in the translation window 128. Further, a small dictionary window 180 appears, showing an alphabetical listing of the words in the dictionary following the letter "I." An "OK" button 182 allows a viewer to exit the dictionary mode. It should be noted that the statistics window 152 is revised in the dictionary mode to indicate that this particular "I" is the first occurrence of 48 total occurrences in the story. Further, the back and forward arrows 156 and 158 may now be used to go to previous and subsequent examples, respectively, of the highlighted word. This feature allows a user to easily observe different occurrences of the same word in the story to gain a better understanding of that word in the context of various sentences.

Figure 8:
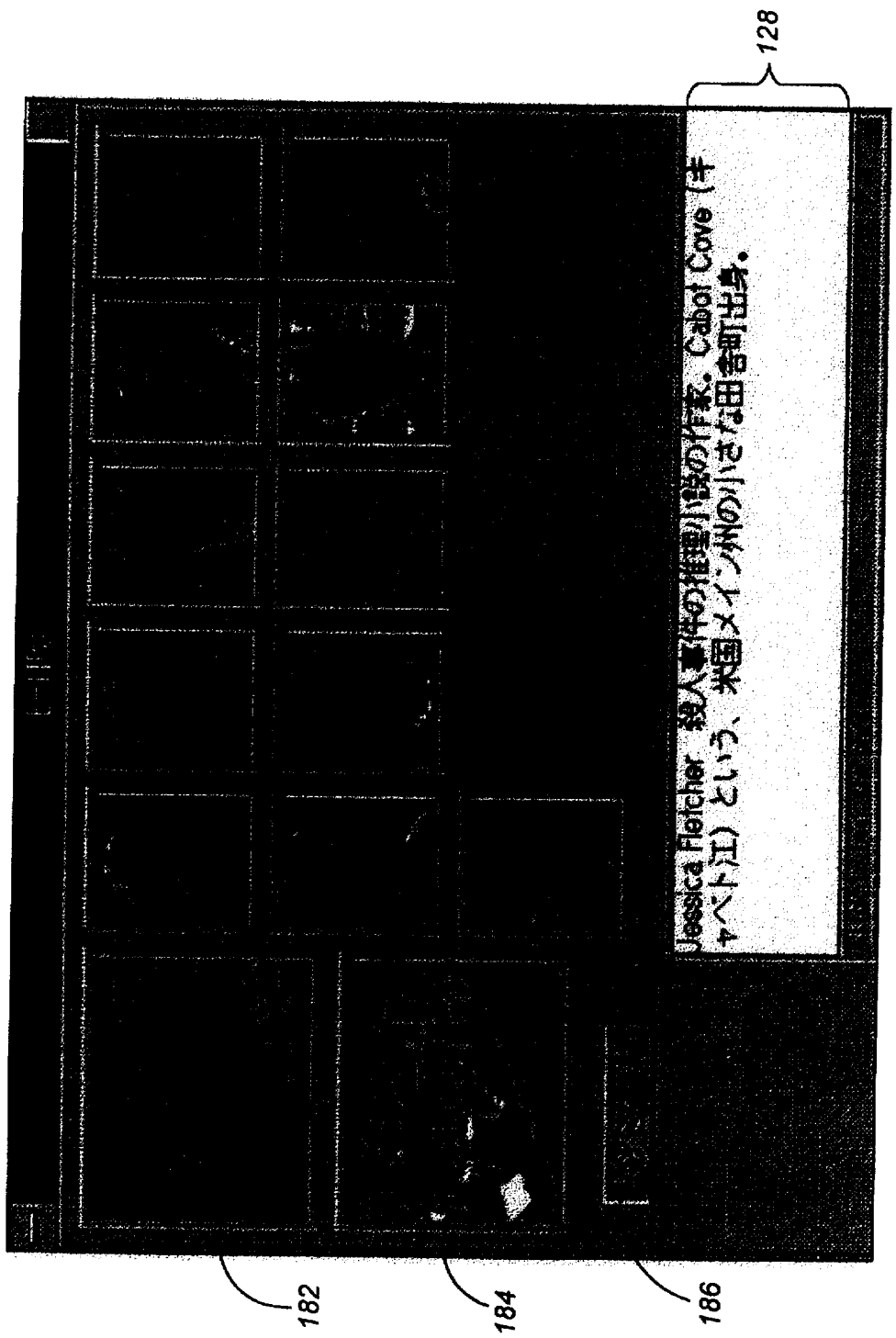
FIG. 8 is a pictorial representation of the "cast of characters" mode of the language instruction program in accordance with the invention.

FIG. 8 illustrates the cast of characters mode of the language instruction program achieved by selecting icon 170 in the control panel. Using this mode, a user may select any picture to get a description of that character. A pair of windows 182 and 184 provide descriptions of the television series and episode, respectively, of the current version of the language instruction program. An exit button 186 allows a user to return to the main menu, shown in FIG. 4A.

The above description is primarily directed toward the user interface aspects of the invention. The following describes some programming aspects of the invention, including two primary databases and other details. In one embodiment of the language instruction program, the language instruction program is written in C++ using Borland Object Windows. A low-level audio interface for windows (.WAV) is used for the audio portion of the language instruction program, except for the pronunciation guide, which utilizes Microsoft's Multimedia Command Interface (MCI) interface having the (.AVI) format. This embodiment of the language instruction program includes a number of C++ modules. Representative modules are listed below:

Module 1—Program entry and initialization

Module 2—Creation and management of top level windows

Module 3—Manages program introduction (theme and opening dialogs)

Module 4—MCI routines for pronunciation guide

Module 5—Dictionary database

Module 6—Implements balloon edit mode

Module 7—Implements icon/selection area behavior

Module 8—Implements the character screen behavior

Module 9—Compiles the episode and dictionary data structures

Module 10—Displays frame bit maps and sets window's palette

Module 11—Manages pronunciation guide window

Module 12—Manages memory allocation

Module 13—Manages the scroll bar behavior

Module 14—Manages the status line information

Module 15—Implements the control panel

Module 16—Manages the translation window

Module 17—Includes an error and message utility

Module 18—Manages the viewing of frames and the playing of sound in the frame display Module 19—Includes low-level audio routines for sound One skilled in the art will recognize that other embodiments that include other languages and data formats can be utilized to implement this invention. Also, different code arrangements and module groupings can be utilized.

Figure 9:
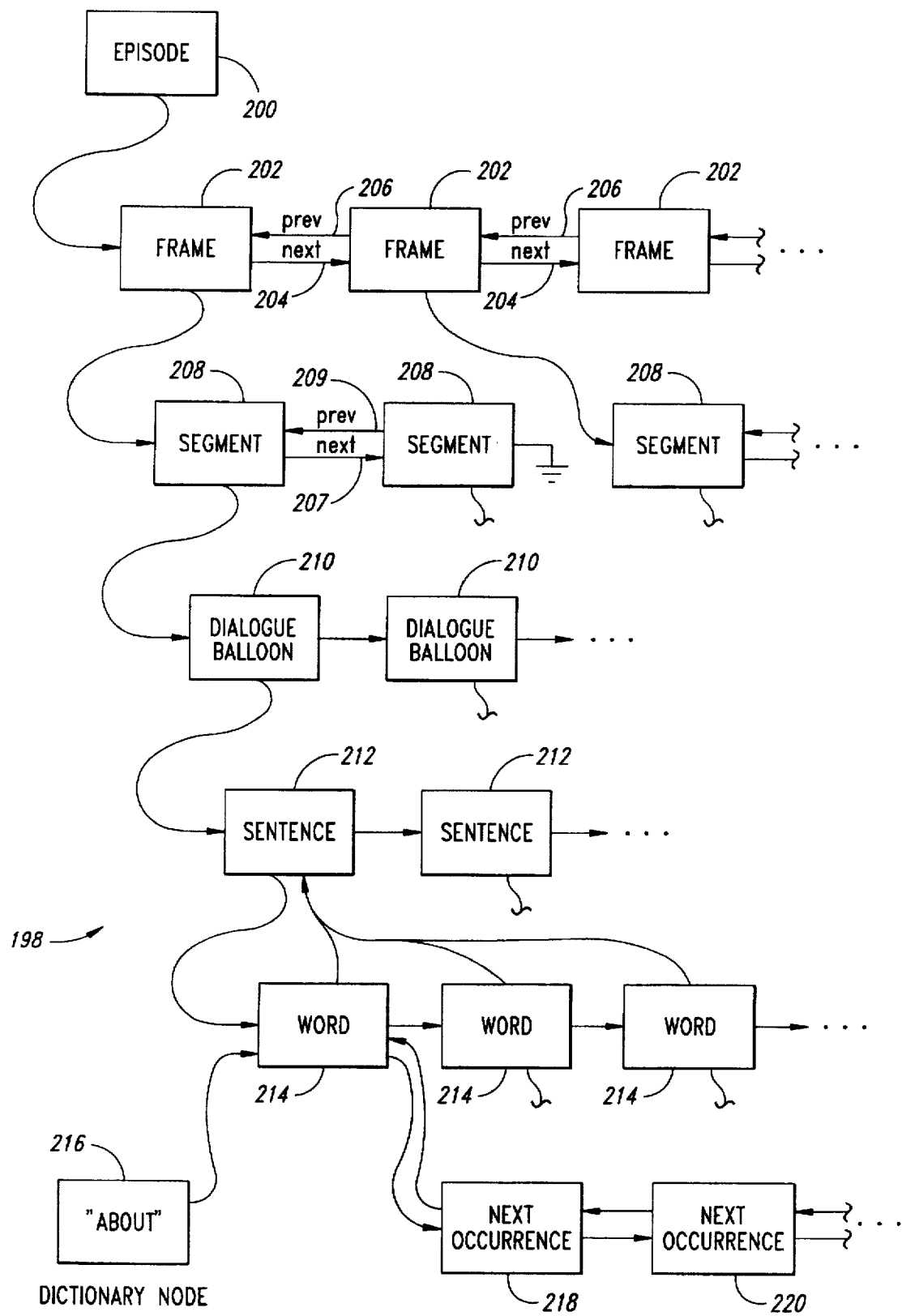
FIG. 9 is a pictorial representation of the episode data structure used by the language instruction program in accordance with the invention.
Figure 10:
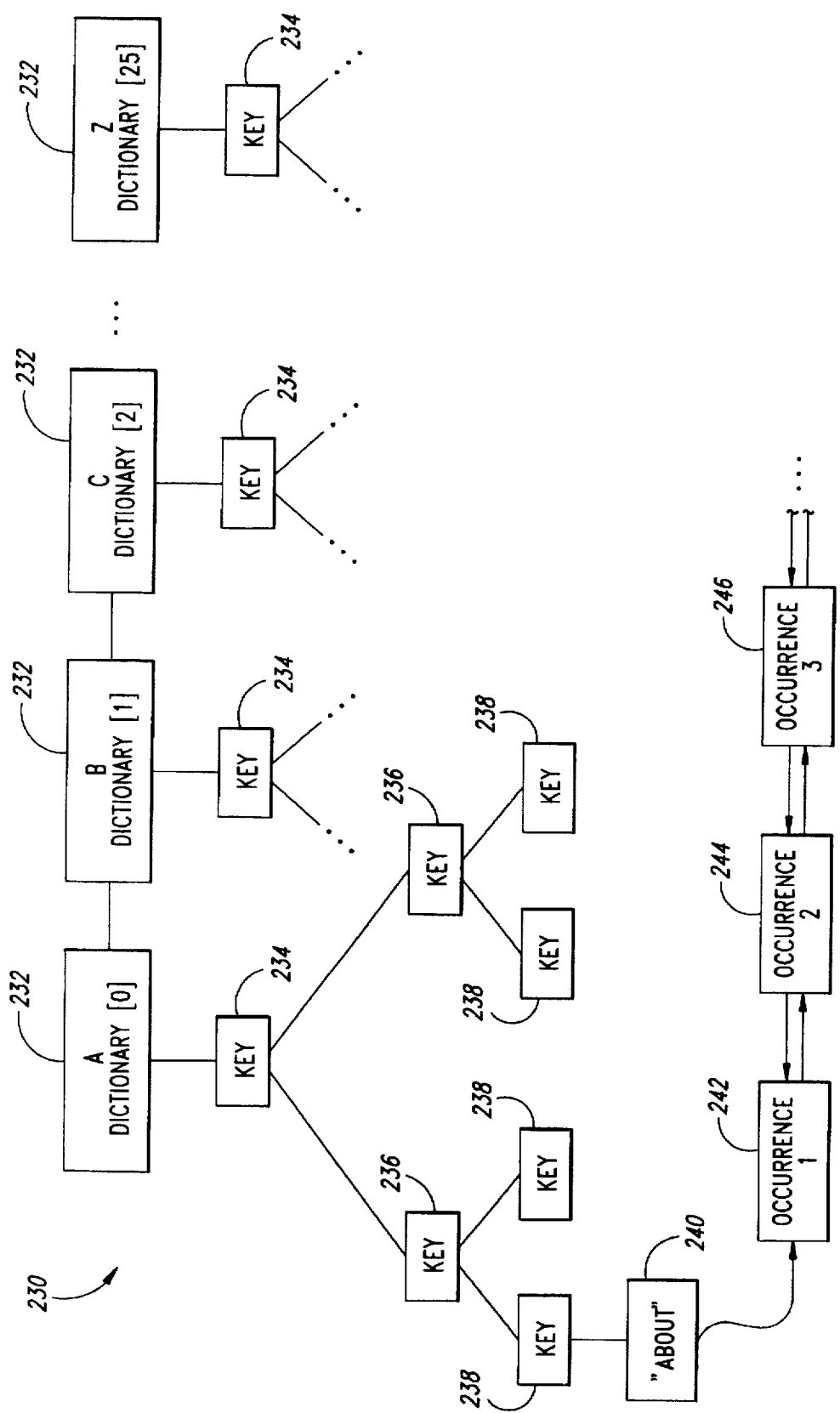
FIG. 10 is a pictorial representation of the dictionary data structure used by the language instruction program in accordance with the invention.

The language instruction program can be implemented using two primary data structures: an episode data structure 198, shown in FIG. 9; and a dictionary data structure, shown in FIG. 10. With reference to FIG. 9, an episode 200 comprises a linked list of nodes or elements. A plurality of frame elements 202 are at the top of the linked list and contain the individual pictorial frames from the episode 200, as described in block 72 of FIG. 2 and accompanying text. Each frame element 202 is linked to either one or two adjacent frame elements 202, shown by arrows 204 and 206. Each frame element 202 contains one or more segments 208 of the audio for the episode that correspond to that frame. The segments may include multiple sentences, and are stored in an audio fie. The segments are also linked to one another, indicated by the arrows 207 and 209. It is at this level that the text and sound in the segment, each segment being associated with a frame, are manipulated as the viewer uses the forward and back buttons of the control panel to peruse the episode.

At the next level of the database, the text segments from each frame are encompassed within a dialog balloon (as described above), the translational string and physical characteristics of which are included in a number of corresponding dialog balloon elements 210. Below the dialog balloon elements 210 are sentence elements 212. The sentence elements 212 are the textual equivalents of the audio in the segments 208, broken down sentence by sentence. At the next level, the words comprising each sentence in the sentence elements 212 are separated and stored as word elements 214.

A dictionary node 216 is used to link each of the word elements with the dictionary database of FIG. 10. In the example shown in FIG. 9, a dictionary node 216 contains the word "about". Also linked to each word element 214 is a pointer indicating other occurrences of that word in the episode 200, shown by blocks 218 and 220.

FIG. 10 illustrates a binary tree 230 that can be used to implement the dictionary data structure of the language instruction program. At its topmost level, the binary tree 230 includes the letters A through Z, referenced by the variable "dictionary [0–25]", as shown in blocks 232. Each node of the binary tree 230 contains a key, with words above a certain letter segment added to one subtree and words below a certain letter segment added to the other subtree. As shown in FIG. 10, the level 1 keys are labeled by reference numeral 234, the level 2 keys by reference numeral 236, and the level 3 keys by reference numeral 238. For clarity, subsequent key levels are not shown.

As an example of the link between the two data structures, block 240 illustrates the word "about" and its link to the episode data structure of FIG. 9 through blocks 242, 244 and 246, i.e., occurrence 1, occurrence 2, and occurrence 3, respectively.

As described above, it is preferable that the pronunciation guide be played while a viewer can see the word being pronounced. In the embodiment of the invention shown in FIG. 6A, the pronunciation guide 122 is located in the upper left corner and is played while the current frame is simultaneously shown in the frame display 126. In one embodiment, the pronunciation guide 122 is stored in a .AVI file and the frame display 126 is stored as a bit map (.BMP file). This embodiment presents a programming difficulty in some windowing environments, e.g., Microsoft Windows®, in that the window palette is typically controlled by only a single entity, e.g., an application or a driver running within an application.

Because the pronunciation guide 122 and the frame display 126 use different window palettes, window palette conflicts may occur when one of the entities is invoked as the other is being displayed. In this this context, the term window palette conflict defines a situation that occurs when the color scheme used in the current entity changes the color palette, and thereby distorts or skews the color scheme in an adjacent, noncontrolling entity.

As an example, assume that the frame display is currently showing the picture illustrated in FIG. 6A. Assume next, upon command from a viewer, that the pronunciation guide 122 is invoked. Without an accommodation, the pronunciation guide 122, stemming from a .AVI file, will change the window palette to the color scheme appropriate for the .AVI file and, as a result, the colors in the frame display 126 will change accordingly. If the color scheme from the .AVI file is different from the color scheme of the frame display, the color in the frame display will change, and may lead to an undesirable display in the frame display portion of the window.

Figure 11:
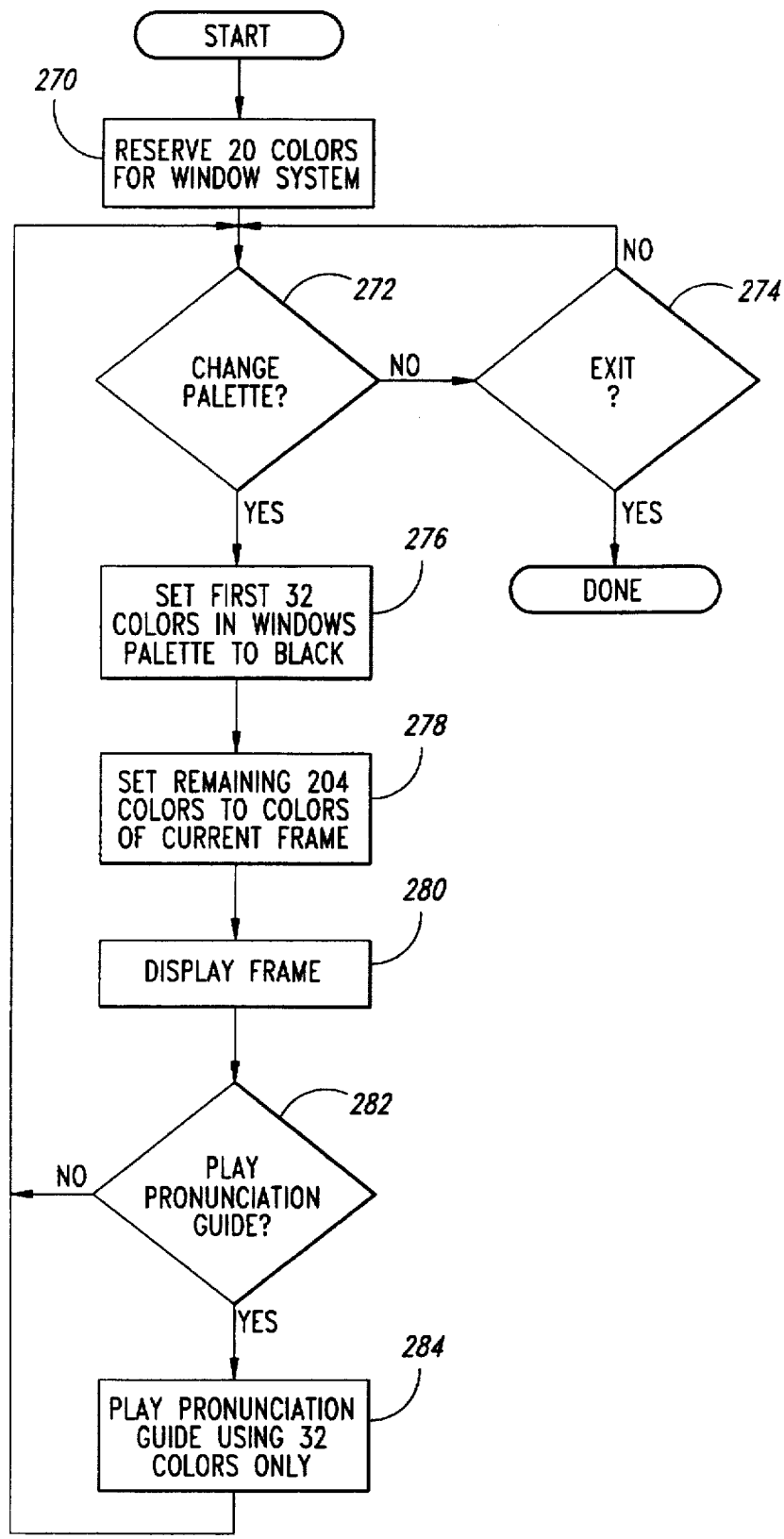
FIG. 11 is a flow diagram of an exemplary routine for manipulating the window color palette in accordance with the invention.

FIG. 11 illustrates a solution to the above-described problem. The solution includes the assumption that 256 colors are available and being used by the multimedia computer. Those skilled in the art will appreciate that a different number of colors may also be used. At block 270, twenty of the available 256 colors are reserved for the windows system. At block 272, a test is made to determine if the color palette is to be changed. The color palette will often change from its previous setting when the pronunciation guide is invoked and during frame transitions. For example, the color palette will usually be changed between the transition of a frame having an outdoor scene and a frame having an indoor scene.

If the color palette is not to be changed, a test is made at block 274 to determine if the routine is done, i.e., if the language instruction program is being exited. If the language instruction program is not being exited, the routine loops to block 272. If the color palette is to be changed, the first 32 colors of the colors remaining in the color palette are set to black at block 276. This will have the effect of reserving these colors for use by the pronunciation guide. At block 278, the remaining 204 colors (256 less (20+32)) are set to the color scheme of the frame to be displayed. The current frame is then displayed using the color scheme at block 280.

At block 282, a test is made to determine if the pronunciation guide is to be played, e.g., the viewer has selected the play button. If the pronunciation guide is not to be played, the routine loops to block 272. If the pronunciation guide is to be played, the animated lips are displayed using the 32 reserved colors only and the sound is played over the speakers, shown at block 284. The routine then loops to block 272.

Figure 12:
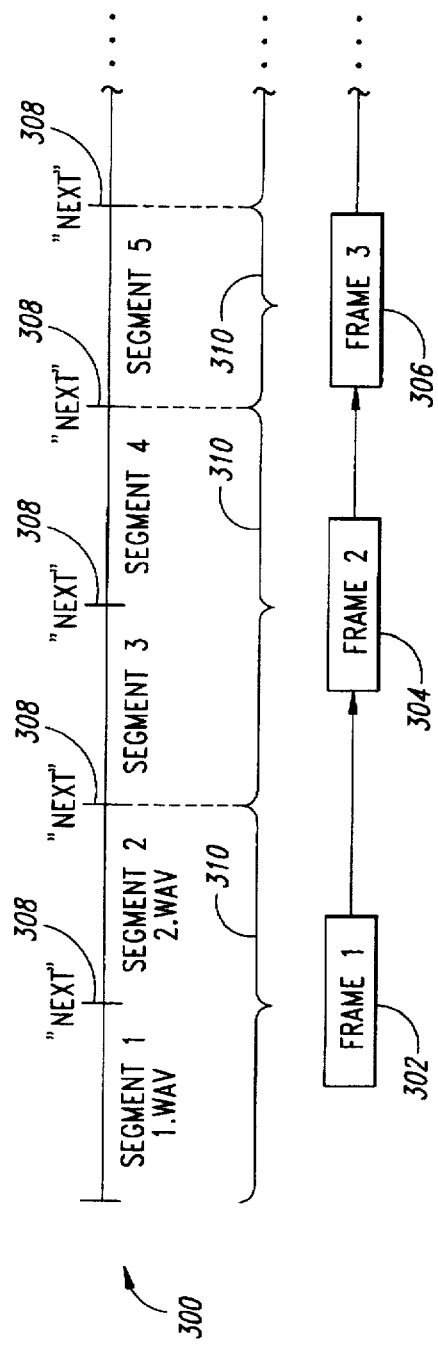
FIG. 12 illustrates the relationship between the segments and frames comprising an episode of the language instruction program in accordance with the invention.

The segments 208 of the episode data structure shown in FIG. 9 will now be described in greater detail. As described above, each segment 208 of an episode of the language instruction program comprises a portion of the audio from the episode stored in a fie, e.g., a "wave" (.WAV) file. Each segment 208 is associated with a display portion, e.g., a bit map (.BMP) file, that corresponds to one of the frames 202. FIG. 12 illustrates an exemplary embodiment of the invention wherein the audio portion, i.e., all of the segments 208 of the episode, is stored as a single wave file 300 and each frame from the episode is stored as a separate bit map file. Bit map files 302, 304 and 306, corresponding to Frames 1, 2, and 3, respectively, are shown.

The wave file 300 is separated into audio portions that correspond to the segments 208 by breaks 308. Further, each segment 208 is associated with a frame by pointers 310. The example in FIG. 12 indicates that segments #1 and #2 are associated with frame 1, segments #3 and #4 with frame 2, and segment #5 with frame 3.

During single-play mode operation of the language instruction program, a viewer will use the "back" and "forward" arrows 156 and 158 or other icons on the control panel 124 to control viewing of segments in the episode. When a segment has been selected, a new frame may need to be displayed. In that case, the bit map file for that frame is retrieved from the memory, e.g., CD-ROM, processed, and displayed. Otherwise, the current frame being displayed remains, although the dialog balloon will change to correspond to the segment. In either case, the audio portion associated with the segment is retrieved from the wave file and played. The language instruction program then awaits further commands from the viewer, wherein the process is repeated for each segment selection.

The foregoing retrieval process is sufficient as long as the episode is being viewed segment by segment under the viewer's control. However, when the language instruction program is being operated in "continuous play mode," the delay associated with the frame bit map retrieval and processing may cause the audio portion of a segment to begin prior to the frame's display. In continuous mode the language instruction program will play the entire wave file, with the bit map pointers 310 controlling the screen display during the playback. To avoid disadvantageous results stemming from the retrieval/processing delay described above, an "offset" may be associated with each audio segment such that the display portion of a frame is retrieved and processed before the audio portion begins to play.

Figure 13:
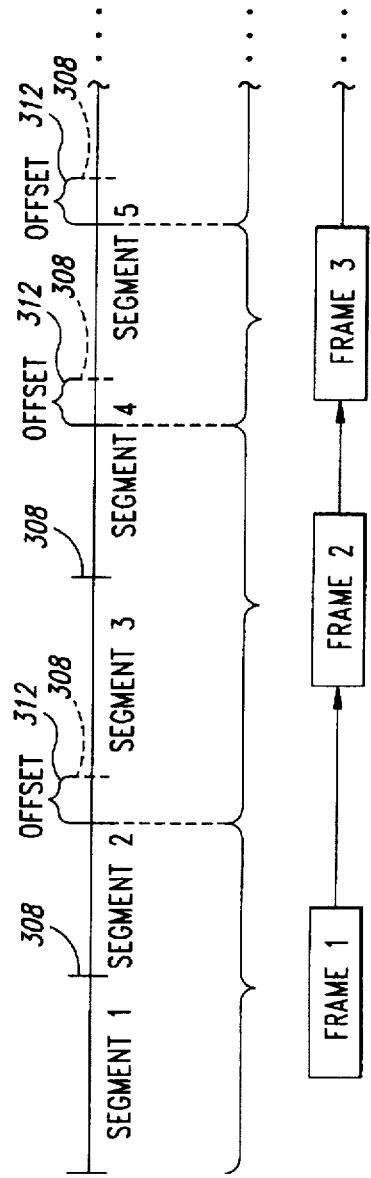
FIG. 13 illustrates an offset feature that is used when the language instruction program is played in continuous mode in accordance with the invention.

FIG. 13 illustrates the use of an offset 312 to begin the frame/bit map retrieval process ahead of the audio playback during continuous play mode. Basically, the offsets instruct the language instruction program to begin the process of displaying the next frame a bit sooner than in the single-play mode. Thus, by the time the audio portion of the segment begins, the frame information will already be present. It is noted that the entire audio track from the wave file is still played, and only the timing of the frame displays is changed by the offset.

Figure 14:
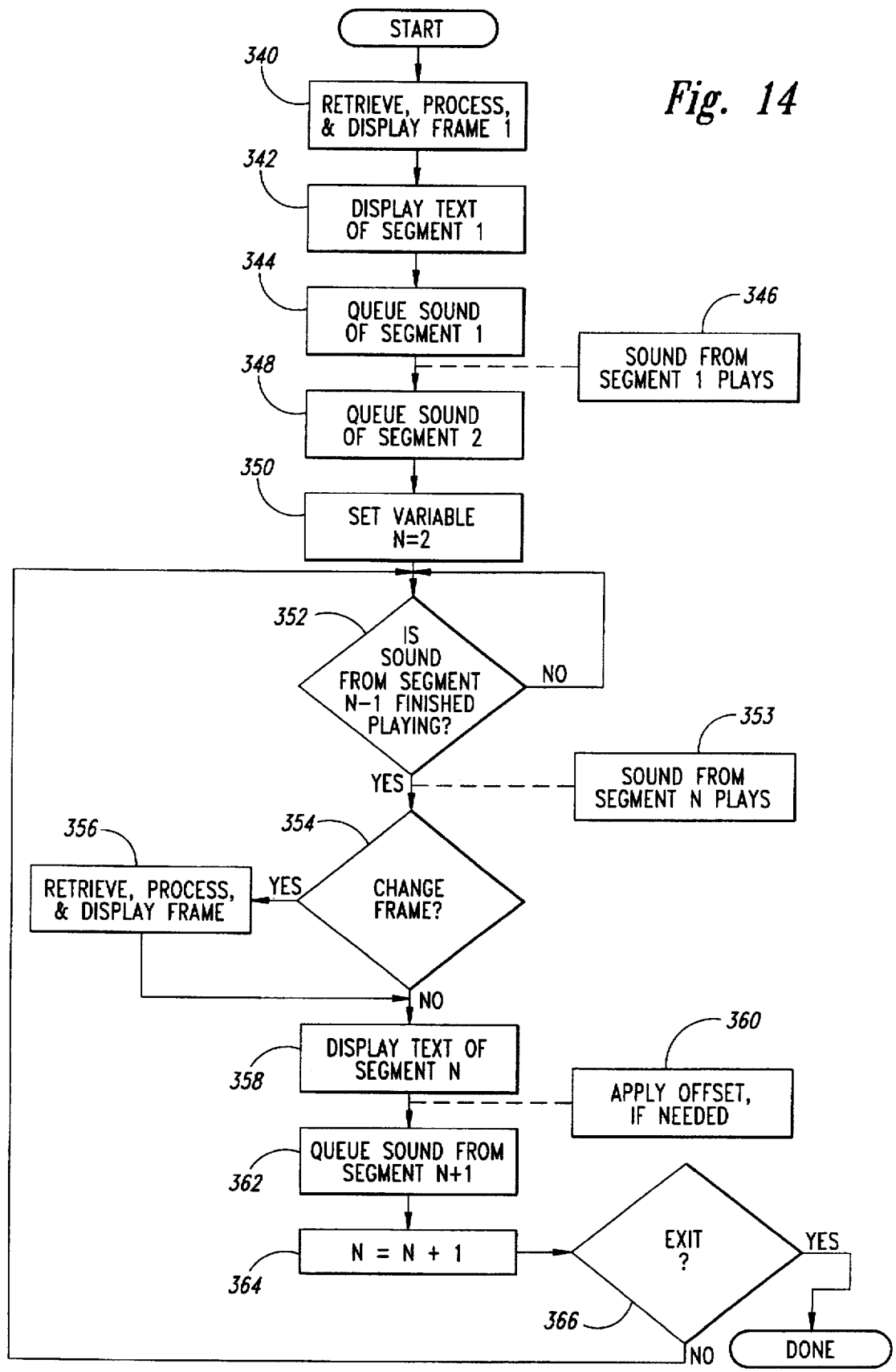
FIG. 14 is a flow diagram of an example routine for implementing the continuos play mode of the invention.

FIG. 14 is a flow diagram illustrating the operation of an exemplary embodiment of the language instruction program in continuous play mode. At block 340, the bit map for frame 1 is retrieved, processed, and displayed. At block 342, the text from segment 1 is displayed on the monitor, i.e., in a dialog balloon. At block 344, the sound from segment 1 is placed in a queue such that it will be played by the multimedia computer. At this point, the sound from segment 1 will begin to play, as indicated by the comment box 346.

At block 348, the sound portion of segment 2 is placed into the queue. At block 350, the variable N is set equal to 2. A test is then made at block 352 to determine whether the sound from segment N−1 is finished playing. If the sound from segment N−1 is not finished playing, the program loops to block 352. If the sound from segment N−1 is finished playing, the sound from segment N will begin to play, as indicated by the comment box 353. A test is then made at block 354 to determine whether the frame is to be changed. This will occur when all of the segments from a particular frame have been played, and a new frame in the episode is to be displayed.

If the frame is to be changed, the new frame is retrieved, processed, and displayed, as shown at block 356. Once this is accomplished, or if the frame was not to be changed, the text of segment N is displayed at block 358. At this point, if there was a change made in the frame, an offset to the sound queue may be applied, as discussed in FIG. 13 and accompanying text. This is indicated by comment box 360.

At block 362, the sound from segment N+1 is placed into the queue. At block 364, the variable N is incremented by 1. A test is made at block 366 as to whether an exit condition occurs, e.g., a viewer has instructed the program to end. If so, the routine terminates. Otherwise, the routine loops to block 352.

From the foregoing, it will be appreciated that the language instruction program in a preferred embodiment provides a number of advantages. One advantage is that, with regard to any particular word in an episode, the language instruction program can: (1) display the foreign language enunciation of the word by use of the pronunciation guide; (2) play the pronunciation of the word over a speaker; (3) play each phrase of dialog in which the word is used in the episode; (4) display the word in each foreign language context in which it appears in the episode; (5) display the familiar language dictionary definitions of that word; (6) display familiar language definitions of words that are similar to the word or in phrases in which the word may be contained; and (7) display the dictionary listings of the word and words around the word. Each of these features help to facilitate the learning of a foreign language by providing a variety of associated audio and visual representations of the word, alone and in context.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method in a computer system for aiding foreign language instruction, the computer system having a memory, a display device, and a speaker, the method comprising the steps of:

storing in the memory an audiovisual presentation of a plurality of words in a foreign language, the audiovisual presentation of each word having
an audible component that includes a presentation of the word in the foreign language, and
a visual component that includes a textual representation of the word in the foreign language and a graphical representation of lips enunciating the word;

selecting a word from among the plurality of words;

retrieving the stored audiovisual presentation for the selected word; and displaying on the display device the visual component of the retrieved audiovisual presentation, including the graphical representation of lips and the textual representation, while playing the audible component of the retrieved audiovisual presentation through the speaker, so that a user can see lips enunciating the selected word while hearing the selected word being spoken and while seeing the selected word as written text, thereby aiding the user in learning how to pronounce the selected word in the foreign language.

2. A method in a computer system for aiding foreign language instruction, the computer system having a stored audiovisual presentation for each of a plurality of words in a foreign language, the audiovisual presentation of each word having an audible pronunciation, a visual text representation, and a graphical representation of a close-up of a mouth enunciating the word, the method comprising the steps of:

displaying the plurality of words in the foreign language by displaying the visual text representation of each of the plurality of words;

selecting a word using a user input device from among the displayed plurality of words;

retrieving the stored audiovisual presentation of the selected word; and concurrently playing back the audible pronunciation of the selected word while displaying the text representation of the selected word and the close-up of the mouth enunciating the selected word.

3. The method of claim 2 wherein the graphical representation of the close-up of the mouth enunciating each word is constructed from a video animation.

4. The method of claim 2, further comprising the step of controlling the speed of movement of the enunciating the selected word while playing back the audible pronunciation of the selected word.

5. The method of claim 2, further comprising the step of displaying a verbatim translation in a familiar language of the selected foreign language word.

6. The method of claim 5, further comprising the step of, concurrent with the displaying of the verbatim translation of the selected foreign language word, displaying a verbatim translation in the familiar language of a word that is related to the selected foreign language word, thereby providing an example of related usage of the selected foreign language word.

7. The method of claim 2 wherein the plurality of words in the foreign language are part of a story.

8. The method of claim 7, further comprising the steps of:

displaying a graphical representation of a plurality of characters in the story;

using the displayed graphical representation, selecting a character; and displaying a description of the role of the selected character in the story.

9. The method of claim 2 wherein the plurality of words in the foreign language are part of an audiovisual story, the story having a plurality of video pictures and audio portions, each video picture associated with an audio portion of foreign language speech relating to the video picture, and further comprising the steps of:

selecting a video picture from the plurality of video pictures;

creating a dialog balloon having foreign language visual text that corresponds to the speech of the audio portion associated with the selected video picture; and displaying the dialog balloon with the foreign language visual text while playing the speech of the audio portion that corresponds to the displayed visual text.

10. The method of claim 9, wherein the step of selecting the word from among the displayed plurality of words in the foreign language selects the word from the visual text displayed in the displayed dialog balloon.

11. The method of claim 9, further comprising the steps of:

creating in the familiar language a colloquial translation of the foreign language visual text displayed in the displayed dialog balloon; and displaying the colloquial translation.

12. The method of claim 2 wherein the plurality of words in the foreign language is part of an audiovisual stow the story having a plurality of video frames and audio segments, each video frame having an associated audio segment, each audio segment having corresponding visual foreign language text, and further comprising the steps of:

displaying a list of the plurality of words in the foreign language;

selecting a word from the displayed list; and playing an audio segment that contains the selected word while displaying the associated video frame and while displaying the foreign language text corresponding to the audio segment.

13. The method of claim 2 wherein the plurality of words in the foreign language is part of an audiovisual story, the story having an ordered sequence of a plurality of video frames and audio segments, each video frame having an associated audio segment and having foreign language text corresponding to the associated audio segment, the plurality of audio segments comprising a soundtrack, and further comprising the step of:

displaying a continuous mode start indicator and a continuous mode stop indicator;

in response to selecting the continuous mode start indicator, displaying the video flames in the ordered sequence while playing the associated audio segments so that the soundtrack in the foreign language is heard in a continuous manner; and in response to selecting the continuous mode stop indicator, selectively displaying, in a sequence that is not the ordered sequence, each video frame while playing the audio segment associated with the video frame and while displaying the foreign language text;

displaying a lip enunciation indicator; and in response to selecting the lip enunciation indicator, determining a word in the displayed foreign language text and displaying the graphical representation of the close-up of the mouth enunciating the determined word.

14. A computer readable memory medium containing instructions for controlling the operation of a computer processor in a computer system to aid foreign language instruction, the computer system having a stored audiovisual presentation for each of a plurality of words in a foreign language, the audiovisual presentation of each word having an audible pronunciation component, a visual text representation component, and a graphical representation component of a close-up of lips enunciating the word, the instructions controlling the operation of the computer processor to perform the steps of:

retrieving the stored audiovisual presentation of a selected one of the plurality of words; and concurrently playing back the audible pronunciation of the selected word while displaying the visual text representation of the selected word and the close-up of lips enunciating the selected word.

15. A method in a computer system for aiding foreign language instruction, the computer system having an audiovisual presentation for each of a plurality of words in a foreign language, the audiovisual presentation of each word having an audible pronunciation, a visual text representation, and a graphical representation of lips enunciating the word, the method comprising the steps of:

displaying the visual text representation of each of the plurality of words in the foreign language;

selecting a word from among the displayed visual text representations;

retrieving the graphical representation of lips enunciating the selected word;

displaying a close-up of the lips enunciating the selected word using the retrieved graphical representation to aid a user in learning to pronounce the selected word; and playing the audible pronunciation of the selected word according to a selectable speed while displaying the close-up of the lips enunciating the selected word, so that the user can see the lips enunciating the selected word while hearing the selected word being spoken.

16. The method of claim 15 wherein the step of displaying the close-up of the lips enunciating the selected word is performed while the visual text representation of the selected word is being displayed, so that a user can see the lips enunciating the selected word while seeing the selected word as written text and further comprising the step of displaying a translation of the selected word in a familiar language.

17. A method in a computer system for providing a foreign language study tool using an audiovisual story, the story having an ordered sequence of video frames and audio segments, each video frame associated with an audio segment of a plurality of words in the foreign language, each video frame having foreign language text corresponding to the plurality of words of the associated audio segment, the plurality of audio segments comprising a soundtrack the method comprising the steps of:

displaying a dictionary mode indicator, a continuous mode start indicator, and a continuous mode stop indicator;

in response to selection of the continuous mode start indicator, automatically displaying the video frames in the ordered sequence while playing the associated audio segments so that the soundtrack in the foreign language is heard in a continuous manner;

in response to selection of the continuous mode stop indicator, stopping the automatic display of the video frames and playing of the associated audio segments; and selectively displaying each video frame while playing the audio segment associated with the video frame and while displaying the corresponding foreign language text, in a sequence that is not in the ordered sequence;

selecting a word from the displayed corresponding foreign language text; and displaying a graphical representation of lips enunciating the selected word while playing the selected word from the associated audio segment;

in response to selection of the dictionary mode indicator, displaying a list of the plurality of foreign language words of the audio segments, wherein when a word is selected from the displayed list, an audio segment containing the selected word is played, while the associated video frame and corresponding foreign language text is displayed, thereby providing an audiovisual example of the selected foreign language word used in context.

18. The method of claim 17, further comprising the steps of:

displaying a east of characters indicator; and in response to selection oft he cast of characters indicator, displaying a graphical representation of a plurality of characters in the audiovisual story;

selecting a character from the displayed graphical representation of the plurality of characters; and displaying a description of the role of the selected character in the audiovisual story.

19. The method of claim 17 wherein the step of selectively displaying each video frame while playing the audio segment associated with the video frame and while playing the corresponding foreign language text further comprising the step of displaying in a familiar language a translation of the selected foreign language word.

20. The method of claim 19 wherein the displayed translation is a verbatim translation.

21. The method of claim 19 wherein the displayed translation is a colloquial translation.

22. The method of claim 17, further comprising the steps of:

selecting a word from the displayed list of the plurality of foreign language words;

selecting art audio segment of foreign language speech that contains the selected word;

creating in the familiar language a colloquial translation of the audio segment of foreign language speech; and displaying the colloquial translation.

23. The method of claim 17 wherein the graphical representation of lips enunciating the selected word is a close-up view of lips.

24. A method for creating a foreign language instruction audiovisual aid in a computer system memory, the method comprising the steps of:

storing in the memory a plurality of video frames with corresponding audio segments of speech, the speech comprising a story in a foreign language;

storing in the memory a dialog balloon for each audio segment, each dialog balloon having visual foreign language text that corresponds to the speech of the audio segment;

associated with each dialog balloon, storing in the memory a colloquial translation in the familiar language of the visual foreign language text of the dialog balloon; and for each word that occurs in the stored audio segments of speech, storing an animated pronunciation guide which is a graphical representation of a close-up of a mouth enunciating the word, in such a manner that a program reading the memory can display the visual foreign language text of the word while playing an audio pronunciation of the word and while displaying the animated pronunciation guide for the word.

25. A computer system for aiding foreign language instruction comprising:

a speaker;

a display device;

a database having a plurality of stored words in a foreign language, each word having an associated stored audio representation of the pronunciation of the word, an associated visual text representation, and an associated graphical representation of lips that demonstrate the enunciation of the word;

audiovisual display code that, in response to being invoked with an indicated word, retrieves from the database the stored audio representation, visual text representation, and graphical representation associated with the indicated word; and displays on the display device the retrieved graphical representation of lips that demonstrate the enunciation of the indicated word while displaying on the display the retrieved visual text and while playing on the speaker the retrieved audio representation; and a selection mechanism that selects a word from among the plurality of foreign language words stored in the database and invokes the audiovisual display code indicating the selected word.

26. The computer system of claim 25 wherein the audiovisual display code displays the retrieved graphical representation of lips as a close-up view of a mouth.

* * * * *